No. 11,745. Reissued June 6, 1899.

G. A. FRIEDRICH.

APPARATUS FOR DRAWING AND SERVING STEAM BEER.

(Application filed July 23, 1898.)

WITNESSES

J. A. Bayless

Elmer Wickes.

INVENTOR

George A. Friedrich by Wallace his atty.

THE NORRIS PETERS CO., PHOTO-LITHO., WASHINGTON, D. C.

UNITED STATES PATENT OFFICE.

GEORGE A. FRIEDRICH, OF SAN FRANCISCO, CALIFORNIA.

APPARATUS FOR DRAWING AND SERVING STEAM-BEER.

SPECIFICATION forming part of Reissued Letters Patent No. 11,745, dated June 6, 1899.

Original No. 546,115, dated September 10, 1895. Application for reissue filed July 23, 1898. Serial No. 686,754.

*To all whom it may concern:*

Be it known that I, GEORGE A. FRIEDRICH, a citizen of the United States, residing in the city and county of San Francisco, State of California, have invented certain new and useful Improvements in Apparatus for Drawing and Serving Steam-Beer, of which the following is a specification.

My invention relates to improvements in devices for drawing and serving from the cask that kind of beer commonly known as "steam-beer;" and these improvements have for their object, mainly, to overcome several defects and objections existing at the present time in devices and apparatus of the kind in use, as hereinafter more particularly described, and to provide an apparatus that has features of cleanliness and readiness of operation and the quality of serving the beer at uniform pressure under the varying conditions of pressure in the cask and at all times sweet and free from sediment.

To this end and object my invention consists in the improved construction of receiver or pressure chamber and of faucet and connections, producing a complete device or apparatus of the kind as hereinafter described, and pointed out in the claims, reference being had in this specification to the accompanying drawings, forming a part thereof.

Figure 1:
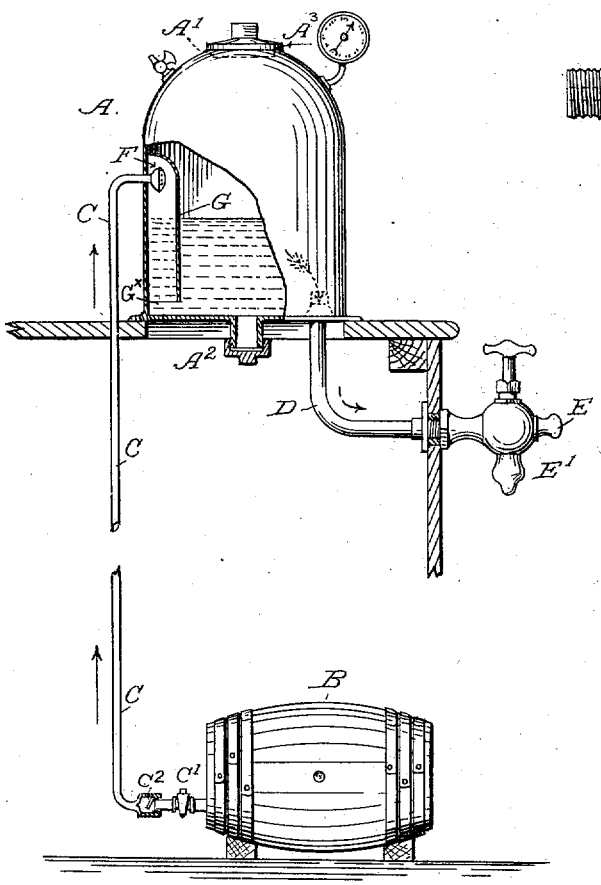
Figure 2:
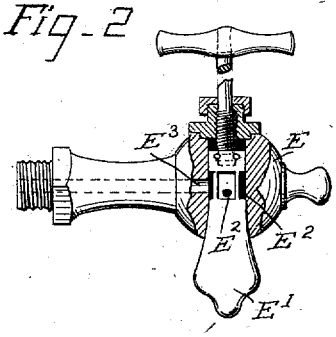
Figure 3:
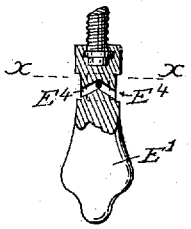
Figure 4:
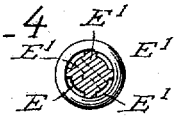

In the said drawings, Figure 1 is a general view in elevation of the complete apparatus with a cask of beer connected to it, the shell of the receiver being partly in section. Fig. 2 is a side view of the faucet on an enlarged scale and partly in section. Fig. 3 is a detail view of the faucet-plug, showing the body of the plug partly in section. Fig. 4 is a cross-section at *x x*, Fig. 3.

A indicates the gas-tight vessel, in devices of this character usually termed the "receiver;" B, the cask of beer, and C the feeder or the pipe connecting the cask with the receiver.

D is the draw-off pipe, through which the beer is drawn from time to time from the receiver into the glass, and E is the faucet at the end of that pipe.

A cock C′ is provided in the pipe C to control the flow into the receiver, and a check-valve $C^2$ is placed in the pipe C to prevent the back-pressure from the receiver into the cask.

The vessel A is usually made of copper tinned or lined on the inside to prevent contamination of the beer by contact with metal surfaces that might improperly affect it, and an opening A′ is provided in the top of sufficient size to admit the hand and a smaller one $A^2$ in the bottom to afford an outlet for washing out the receiver. The opening A′ is closed by a screw-plug and a washer or packing $A^3$, while a coupling is provided on the bottom of the receiver, around the outlet $A^2$ before mentioned, either for connecting to it a waste-pipe or for closing it by a screw-cap, as shown. This receiver A being, as stated, made air-tight, it is required that provision be made to provide for the escape of gas which accumulates therein, else the operation of the device will be impaired and the receiver become what is termed "gas-bound"—that is, the pressure of the retained gas will be such as to retard the flow of liquor into the receiver. This is obviated by connecting with the receiver a vent or gas-escape. (Clearly shown in Fig. 1 of the drawings.) After the apparatus has been in use for a number of hours this vent or cock should be operated, so as to permit the gas accumulated therein to make its escape. Any suitable style of vent may be employed, but I prefer that illustrated in the drawings. Without provision being made for venting the receiver the device will be inoperative, owing to the fact that the gas generated from the steam-beer confined therein gradually increases in pressure until the back pressure thereof is sufficient to overcome the pressure in the cask, when flow of the beer will naturally cease or be checked. It will thus be observed that it is imperative that provision be made to exhaust the gas accumulated within the receiver.

The object of this construction is to provide such facilities for cleaning out the receiver that all foul gases and odors can be effectually removed and prevented from collecting by frequently washing out the chamber, and thus a sweet condition can be insured at all times in the beer being served. Heretofore in devices for serving steam-beer these receivers have been provided with only one opening and that located in the bottom, so that it became a difficult matter to dislodge the foul air and gases and to thoroughly clean out the receiver, and as ordinarily carried out the interior of the receiver frequently retained foul gases and bad odors after the cleansing operation. The feeder D enters the receiver through the side, in which it is suitably fixed to insure a tight joint, and the inner end of the feeder is provided with a perforated cap F. Over this perforated end last mentioned is fixed a long and relatively narrow shield or hood G against the inside wall of the receiver, the lower end of which part G is carried down perpendicularly to within a short distance from the floor or bottom of the receiver, where it terminates in the mouth or opening $G^{\times}$.

By the construction last described the beer is caused to flow quietly and to charge the receiver without stirring up and diffusing through the beer the sediment on the bottom of the chamber, and that part which is thick or muddy is not disturbed by the charges or quantities passing up from the cask from time to time in the operation of the device, as the combined effect of the perforated end and the shield or hood is to prevent this disturbance even when the pressure in the cask is the greatest.

The improved point or feature in the faucet portion of my apparatus consists in forming in a faucet having a longitudinally-movable plug E′ a number of recesses $E^2$ in the surface of the plug just above the enlarged end that projects downwardly from the body of the faucet, these recesses being located in that portion of the body which is situated in line with the passage-way $E^3$ in the faucet-body. These recesses are shallow depressions in the cylindrical surface and are usually made of rectangular form in outline with an excess in the length over the breadth of the recess. Four of these cavities or recesses I have found to answer the purpose, and these arranged at regular distances apart around the circumference of the plug-body I connect together by transverse passages $E^4$ $E^4$, formed by boring holes from the lower part of each cavity or recess toward the center of the plug and with an upward slant and meeting together in the middle of the plug-body. This construction is shown in Figs. 2, 3, and 4 of the drawings.

The faucet used for the part E of my apparatus is of that class or description having a solid plug, around which the beer flows out when the plug is moved perpendicularly in the faucet-body, and in all other respects but that pertaining to the plug-body this faucet portion E of my apparatus is the same as the construction of devices generally used at the present time for serving steam-beer. The object of this construction relating to the faucet portion E is to prevent excessive foaming and the production of froth at the first drawing into the glasses, particularly when drawing from a freshly-tapped cask, at which time the pressure in the receiver is necessarily the greatest, and by this improvement in the plug I am enabled to serve steam-beer without excess of froth, and at the same time I avoid the necessity hitherto experienced of reducing the pressure in the receiver by blowing off, particularly in serving from a fresh cask. The cavities or depressions in the plug E effectually overcome excessive frothing and cause the beer to flow quietly and with proper life into the glass, and they enable the pressure to be maintained in the receiver and cask even after a considerable quantity of the contents of the cask has been drawn off, because there is no need of reducing the pressure in the receiver at the time of first drawing when the cask is freshly tapped.

This apparatus is also adapted for serving ale from the cask.

Having thus fully described my invention, what I claim as new therein, and desire to secure by Letters Patent, is—

1. The herein-described apparatus for drawing and serving steam-beer, comprising a receiver having an opening in the top and a removable plug closing the same, a waste-opening in the bottom, a closure therefor, a vent for the receiver, a feeder-pipe connecting the receiver with a cask, a check-valve in said pipe, a perforated nozzle on the receiver end of said pipe, a shield within the receiver covering said nozzle and extending downwardly to within a short distance of the bottom of the receiver, a service-pipe, and a faucet for the latter, substantially as described.

2. In an apparatus for drawing steam-beer, the combination, with the receiver to which the cask is connected, of the service-pipe and a faucet thereon having a longitudinally-movable plug provided with recesses or cavities in its body, substantially as described.

3. In an apparatus for drawing and serving steam-beer the combination of a receiver having a hand-hole in the top thereof, a removable closure therefor, a waste-aperture in the bottom, a closure therefor, a shield within said receiver at one side extending downwardly to within a short distance of the bottom, a supply-pipe connecting with the receiver at the side thereof behind said shield and adapted to direct its flow against the same, a vent for the receiver, and a service-pipe provided with a faucet, substantially as described.

4. In an apparatus of the kind described, the combination of a receiver, a shield therein extending to near the bottom thereof, a supply-cask, a pipe from the latter to the receiver and entering the same so as to direct its flow against said shield, a vent for the receiver and a service-pipe provided with a faucet connected to said receiver, substantially as described.

5. In an apparatus of the kind described, the combination of a suitable receiver, a shield therein at one side extending to near the bottom of the receiver, a vent for the receiver, a supply-cask, a pipe from the latter to the receiver and entering the same at the side behind said shield, a perforated nozzle for said pipe adapted to spray the beer against said shield, and a service-pipe provided with a faucet connected to said receiver, substantially as described.

In testimony whereof I have hereunto affixed my signature, in the presence of witnesses, this 7th day of July, 1898.

GEORGE A. FRIEDRICH.

In presence of—
N. A. ACKER,
LEE D. CRAIG.